United States Patent
Wolf

(10) Patent No.: US 9,175,763 B2
(45) Date of Patent: Nov. 3, 2015

(54) BELT PULLEY FOR A CRANKSHAFT IN A VEHICLE

(71) Applicant: GM GLOBAL TECHNOLOGY OPERATIONS LLC, Detroit, MI (US)

(72) Inventor: Tobias Wolf, Idstein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 14/136,534

(22) Filed: Dec. 20, 2013

(65) Prior Publication Data

US 2014/0194237 A1   Jul. 10, 2014

(30) Foreign Application Priority Data

Dec. 20, 2012   (DE) .......................... 10 2012 024 958

(51) Int. Cl.
| | | |
|---|---|---|
| *F16H 55/36* | (2006.01) | |
| *F16D 3/00* | (2006.01) | |
| *F16D 55/14* | (2006.01) | |
| *F16H 55/48* | (2006.01) | |

(52) U.S. Cl.
CPC ................ *F16H 55/48* (2013.01); *F16H 55/36* (2013.01); *F16H 2055/366* (2013.01)

(58) Field of Classification Search
CPC ... F16H 2055/366; F16D 3/68; F16D 41/206; F16B 67/206
USPC .................................................. 474/94, 178
See application file for complete search history.

(56) References Cited

U.S. PATENT DOCUMENTS

| | | | | |
|---|---|---|---|---|
| 2,381,488 | A | * | 8/1945 | Coulson ........................... 474/94 |
| 3,257,860 | A | * | 6/1966 | Runde et al. .................... 474/94 |
| 4,002,081 | A | * | 1/1977 | Schultz, Jr. ..................... 474/94 |
| 4,307,584 | A | * | 12/1981 | Sandiumenge ................. 464/74 |
| 4,328,879 | A | * | 5/1982 | Tone ............................. 180/219 |
| 4,355,990 | A | * | 10/1982 | Duncan, Jr. ..................... 474/94 |
| 4,585,431 | A | * | 4/1986 | Umeda et al. ................... 474/94 |
| 4,795,402 | A | * | 1/1989 | Reichardt ....................... 464/74 |
| 5,393,266 | A | | 2/1995 | Braun et al. |
| 5,540,626 | A | * | 7/1996 | Asai et al. ....................... 474/94 |
| 5,722,909 | A | * | 3/1998 | Thomey .......................... 474/87 |
| 5,988,015 | A | * | 11/1999 | Riu ............................... 74/574.2 |
| 6,026,709 | A | * | 2/2000 | Depp et al. ................. 74/573.12 |
| 6,045,448 | A | * | 4/2000 | Kern et al. ...................... 464/74 |
| 6,083,130 | A | * | 7/2000 | Mevissen et al. .............. 474/70 |
| 6,161,512 | A | * | 12/2000 | Beels Van Heemstede ................ 123/90.31 |
| 6,702,681 | B1 | * | 3/2004 | Ochs .............................. 464/90 |
| 6,722,993 | B2 | * | 4/2004 | Tabuchi et al. ................. 464/34 |
| 6,742,412 | B2 | * | 6/2004 | Feldhaus et al. ............. 74/574.2 |

(Continued)

FOREIGN PATENT DOCUMENTS

DE           4421637 A1    1/1996

*Primary Examiner* — Henry Liu
(74) *Attorney, Agent, or Firm* — Ingrassia Fisher & Lorenz PC

(57) ABSTRACT

A belt pulley is provided for a crankshaft in a vehicle. The belt pulley can be mounted on an end of the crankshaft projecting from an engine block. The belt pulley includes, but is not limited to a drive disc, which can be fixed on the end of the crankshaft projecting from the engine block in a rotationally fixed manner, vibration damper which includes, but is not limited to a bulge that is elastically connected to the drive disc and an end body, which includes, but is not limited to a hollow space. A sound-damping component is arranged in the hollow space and the hollow space is covered by means of a cover disc.

18 Claims, 5 Drawing Sheets

(56) References Cited

U.S. PATENT DOCUMENTS

| | | | |
|---|---|---|---|
| 7,048,661 B2* | 5/2006 | Shibata et al. | 474/94 |
| 7,204,772 B2* | 4/2007 | Huber | 474/94 |
| 7,591,357 B2* | 9/2009 | Antchak et al. | 192/55.5 |
| 7,794,296 B2* | 9/2010 | Nakagawa et al. | 440/75 |
| 7,985,150 B2* | 7/2011 | Kamdem | 474/94 |
| 8,419,574 B2* | 4/2013 | Serkh et al. | 474/94 |
| 8,789,670 B2* | 7/2014 | Antchak et al. | 192/41 S |
| 8,820,503 B2* | 9/2014 | Schneider et al. | 192/55.5 |
| 2002/0165053 A1* | 11/2002 | Kimura et al. | 474/70 |
| 2003/0199348 A1* | 10/2003 | Huber | 474/94 |
| 2004/0079566 A1* | 4/2004 | Radomile et al. | 180/65.5 |
| 2006/0264282 A1* | 11/2006 | Moriya et al. | 474/94 |
| 2008/0139351 A1* | 6/2008 | Pflug et al. | 474/94 |
| 2008/0312014 A1* | 12/2008 | Stief et al. | 474/94 |
| 2009/0197719 A1* | 8/2009 | Ali et al. | 474/94 |
| 2009/0305828 A1* | 12/2009 | Rasche | 474/94 |
| 2010/0029422 A1* | 2/2010 | Riu | 474/94 |
| 2010/0273589 A1* | 10/2010 | Grobbel | 474/94 |
| 2011/0065537 A1* | 3/2011 | Serkh et al. | 474/94 |
| 2011/0263365 A1* | 10/2011 | Mende et al. | 474/94 |
| 2012/0088616 A1* | 4/2012 | Ali et al. | 474/94 |
| 2012/0149511 A1* | 6/2012 | Hodjat | 474/94 |
| 2012/0172163 A1* | 7/2012 | Fitz | 474/94 |
| 2012/0322592 A1* | 12/2012 | Mortari | 474/94 |
| 2013/0217524 A1* | 8/2013 | Antchak et al. | 474/94 |
| 2013/0284139 A1* | 10/2013 | Staley | 123/179.25 |

* cited by examiner

BELT PULLEY FOR A CRANKSHAFT IN A VEHICLE

CROSS REFERENCE TO RELATED APPLICATION

This application claims priority to German Patent Application No. 10 2012 024958.6 filed Dec. 20, 2013, which is incorporated herein by reference in its entirety.

TECHNICAL FIELD

The technical field generally relates to a belt pulley for a crankshaft in a vehicle.

BACKGROUND

A belt pulley can be provided with a torsional vibration damper. A belt pulley with a torsional vibration damper makes possible decoupling the torsional vibrations during the crankshaft operation from the natural vibration of the crankshaft. For this reason, the torsional vibration damper for a crankshaft is frequently also described as decoupler. The torsional vibrations are created through the alternately occurring combustion pressures in the individual cylinders of the internal combustion engine. These torsional vibrations are superimposed on the natural vibrations of the crankshaft so that in an extreme case a fracture of the crankshaft can occur.

Thus, the torsional vibration damper on the projecting end of the crankshaft serves to enlarge the frequency differential between the frequency of the torsional vibrations and the frequency of the natural vibration of the crankshaft. To this end, a driving disc is connected to the crankshaft in a fixed manner, while the belt pulley is connected to the crankshaft in a vibration-damped manner via the torsional vibration damper and via the drive pulley. Thus, torsional vibrations of the crankshaft can be reduced or transmitted to the transmission in a reduced manner or not at all in order to reduce the noise emission.

In view of the foregoing, further reductions of the noise emissions however are desirable. In addition, other objects, desirable features and characteristics will become apparent from the subsequent summary and detailed description, and the appended claims, taken in conjunction with the accompanying drawings and this background.

SUMMARY

A belt pulley is provided for a crankshaft in a vehicle. The belt pulley can be mounted on an end of the crankshaft projecting from an engine block. The belt pulley comprises a drive pulley, which can be fixed on the end of the crankshaft projecting from the engine block in a rotationally fixed manner, a torsional vibration damper comprising a bulge, which is elastically connected to the drive pulley, and an end body which comprises a hollow space. A sound-damping component is arranged in the hollow space and the hollow space is covered by means of a cover disc.

By attaching a cover disc and by introducing a sound-damping component, which is held in the hollow space of the end body of the belt pulley through the cover disc, it is possible to significantly reduce the sound emission of both the belt pulley as well as the drive disc, which is directly operationally connected to the crankshaft. The torsional vibration damper comprises a bulge which forms a mass and which is elastically connected to the drive disc. The elastic connection and the mass provide the torsional vibration damper. The torsional vibration noises being emitted by the crankshaft via the drive disc at the face end of the engine region are additionally moderated directly at the source of the emission with the help of the sound-damping component to the extent that these are not perceived as disturbing. To this end, the cover disc can have an intensive contact with the sound-damping component and be fixed on the separating disc in such a manner that a sound transmission is largely avoided even by way of the fixing.

Dependent on the configuration of the belt pulley, the drive disc or the torsional vibration damper can provide the end body with the hollow space. The cover disc is thus fixed either on the drive disc, when the latter forms the end body, or on the torsional vibration damper, when the latter forms the end body. The cover disc in an exemplary embodiment is fixed on the end body in a sound-damping manner in order to further reduce the sound transmission.

In an embodiment, the sound-damping component therefore comprises a flange-like collar that is arranged between the end body and the cover disc. Thus, the cover disc advantageously has no direct sound-transmitting contact with the sound-emitting source, so that with the collar the sound-damping component of the sound damping is further improved.

In an embodiment, the fixing comprises sound-damping parts between the cover disc and the end body. For example, the fixing can comprise sound-damping washers which are arranged between the cover disc and screws and nuts of the fixing.

In an embodiment, the sound-damping component comprises at least one element selected from the group consisting of an elastic foam material, a felt materials saturated with a hydrophobic varnish, an elastomer fibrous plastic and a cork material coated with hydrophobic varnish. According to a further embodiment, an elastic foam material such as foam rubber, silicone rubber, cellular rubber, cellular polyethylene or similar rubber-elastic materials of elastomers is employed according to a further embodiment.

Fibrous materials, such as for example felt materials are also suitable as sound-damping materials and are saturated in a further embodiment with hydrophobic varnish in order to increase the longevity of the felt materials. Other fibrous elastomer plastics can be employed as sound-damping material, wherein the fibers are held together with the help of binding agents, more so since the sound-damping component; in particular the collar is exposed to substantial centrifugal forces. In general it is also possible in a further embodiment to employ a renewable cork material, which for increasing the possible duration of use or operating duration can be coated with a hydrophobic varnish.

In an exemplary embodiment, the sound-damping component comprises a press fit in the hollow space. In the case of elastomer materials it is advantageous if the sound-damping component comprises a press fit with respect to a hollow space, which is defined on the front side on the drive disc between bulge and centre. With this press fit in the hollow space and the press fit between cover disc and collar of the sound-damping component it can be ensured that the sound-damping component during the operation of the V-belt pulley remains in the intended sound-damping position on the front side.

A further possibility of securing the seat of the sound-damping component in the hollow space is to connect the sound-damping component with the hollow space in a materially joined manner. This can be advantageously affected through an adhesive, which however renders disassembly for relevant maintenance and repair operations more difficult, more so since the sound-damping component cannot be removed from the hollow space without being destroyed. The bulge of the torsional vibration damper can be connected to the drive disc via at least one spring element or via at least one elastic component, such as for example a rubber ring, in order to form an elastic connection and consequently torsional vibration-damping connection.

The torsional vibration damper in an embodiment is connected to the belt pulley via the bulge in a fixed manner. With this fixed connection, the mass of the bulge can also act in a damping manner on torsional vibrations of the drive disc, which during the operation is connected to the crankshaft in a fixed manner.

To this end, the cover disc in a further embodiment comprises bores that are aligned with threaded pins on the end body, wherein nuts are in engagement with the threaded pins, fixing the cover disc and the collar of the sound-damping component on the end body. The number of the threaded pins having sound contact with the end body is kept as low as possible. The cross section of these threaded pins is likewise reduced to a necessary minimum. In addition, vibration-damping washers can be arranged between nut, threaded pins and cover disc in order to keep the sound coupling as low as possible.

In an embodiment, the end body comprises threaded bores and the cover disc bores that are aligned with the threaded bores. Screws are in engagement with the threaded bores and fix the cover disc and the collar of the sound-damping component on the end body. Instead of the threaded pins, merely threaded bores are provided in the end body so that it is possible to fix the cover disc via corresponding bores in the cover disc with screws on the collar of the sound-damping component. Here, the screws are in engagement with the threaded bores in order to fix the cover disc and the collar of the sound-damping component on the end body.

Furthermore, a vehicle is provided that comprises an engine block with a crankshaft, which has a crankshaft end projecting from the engine block, on which a belt pulley according to any one of the preceding exemplary embodiments is arranged. The drive disc of the belt pulley is connected to the crankshaft in a fixed manner.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
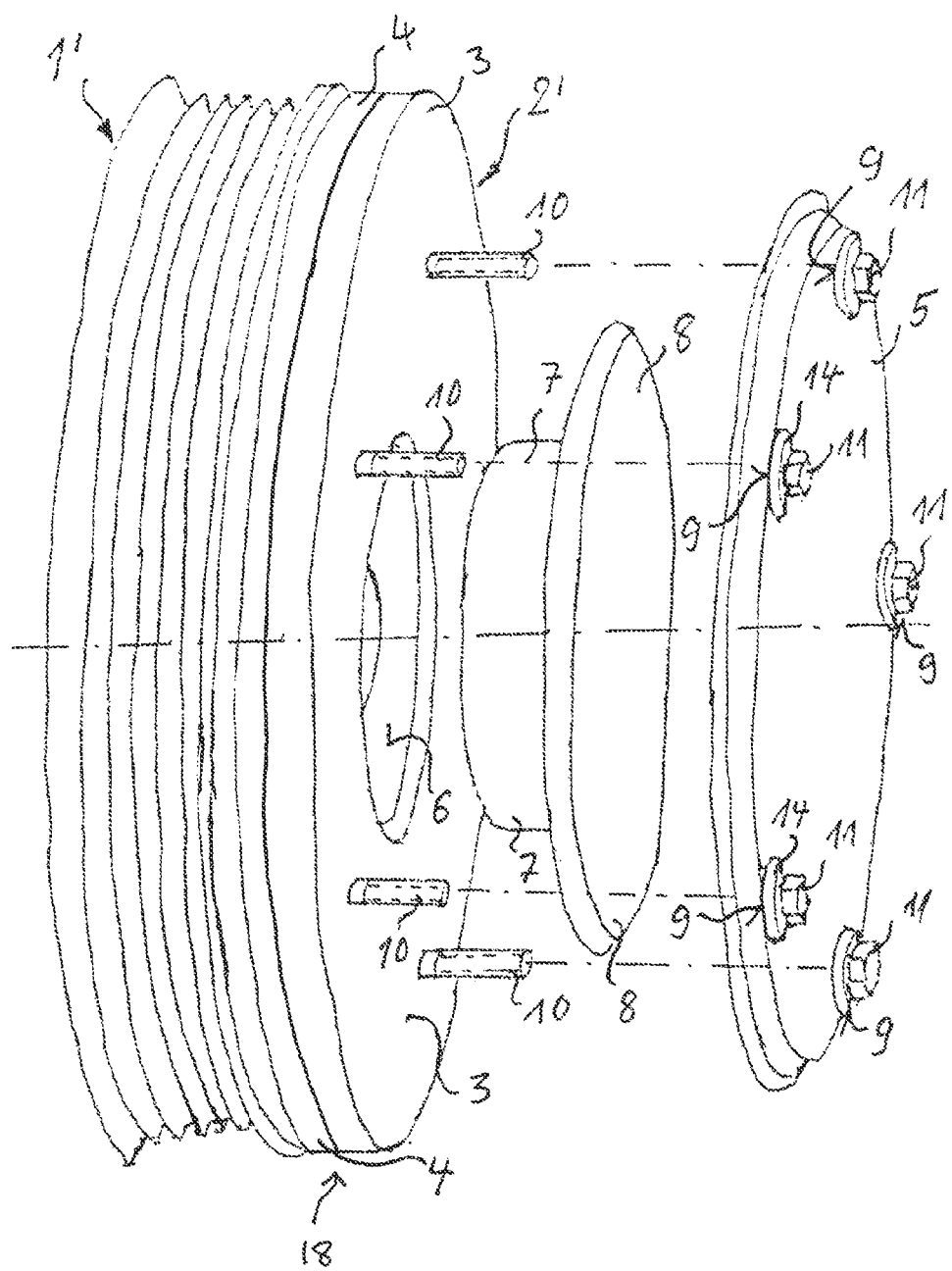
FIG. 1 shows a schematic, expanded, perspective view of a belt pulley with torsional vibration damper according to a first embodiment.

FIG. 1 shows a schematic, expanded, perspective view of a belt pulley 1' with torsional vibration damper 2' according to a first embodiment. Here, the belt pulley 1' is designed as a multiple V-belt pulley 1 and comprises a first end body 18, which is arranged next to an end of a crankshaft of an internal combustion engine which is not shown in FIG. 1. The belt pulley 1' is not directly connected to the crankshaft, but is connected to the crankshaft of the internal combustion engine via the torsional vibration damper 2'.

To this end, the belt pulley 1' comprises a drive disc 3, which is fixed on a front end of the crankshaft of the internal combustion engine in a rotationally fixed manner. The torsional vibration damper 2' comprises a bulge 4, which forms the gyrating mass of the torsional vibration damper 2', while the belt pulley 1' is mechanically and elastically connected to the bulge 4 via spring elements which are not visible in FIG. 1.

In this embodiment, the drive disc 3 forms the end body 18 of the belt pulley 1'. In this embodiment, the bulge 4 is annular and arranged on the inside of the drive disc 3. The drive disc has a circular contour. A hollow space 6 is formed in the drive disc 3. The hollow space 6 is circular and has a depth so that it can be described as pot-like. The hollow space 6 is arranged coaxially with the crankshaft and thus in the middle of the drive disc 3.

In this embodiment according to FIG. 1 the aim is to effectively dampen the sound emissions, which are emitted through the torsional vibration damper 2' and in particular through the drive disc 3 of the torsional vibration damper 2'. To this end, a sound-damping component 7 is provided which is formed in such a manner that it can be accommodated in the hollow space 6 in the drive disc 3. In addition, the sound-damping component 7 comprises a collar 8, which projects over the circular hollow space 6 and with which the sound-damping component 7 is clamped in between a cover disc 5 and the drive disc 3. For clamping, the drive disc 3 comprises threaded pins 10, which are aligned with bores 9 in the cover disc 5. For fixing the cover disc 5, nuts are provided which via washers 14 the cover disc 5 can be screwed onto the threaded pins 10 subject to clamping the collar 8 of the sound-damping component 7.

Figure 2:
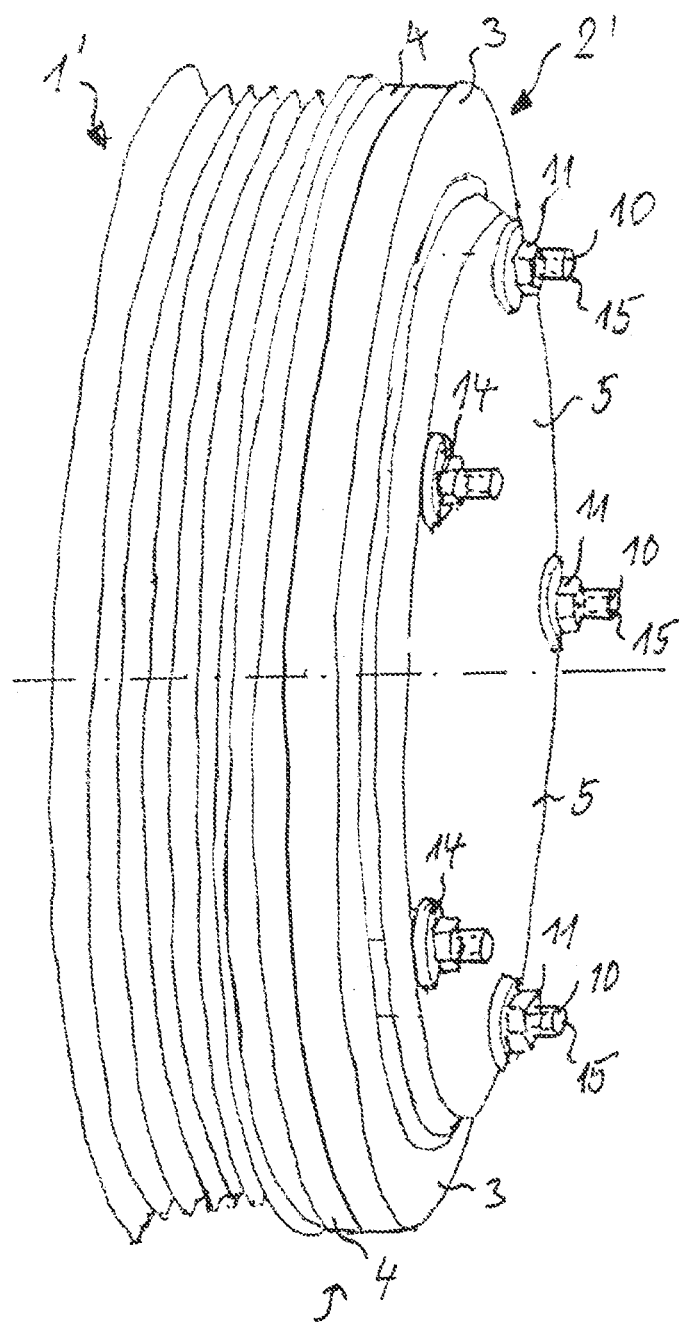
FIG. 2 shows a schematic, perspective view of the belt pulley with torsional vibration damper according to FIG. 1 following assembly of the belt pulley.

FIG. 2 shows a schematic perspective view of the belt pulley 1' with torsional vibration damper 2' according to FIG. 1 following assembly of the belt pulley 1'. Following the assembly, the sound-damping component 7 disappears completely in the hollow space except for the collar 8 which is visible in FIG. 1, as shown in FIG. 1. Thus, the belt pulley 1' with the torsional vibration damper 2' is completely closed through the cover disc 5, wherein the ends 15 of the threaded pins 10 project out of the cover disc 5. Here, the nuts 10 do not directly touch the cover disc 5 but are fixed on the cover disc 5 with sound-damping washers 14.

Figure 3:
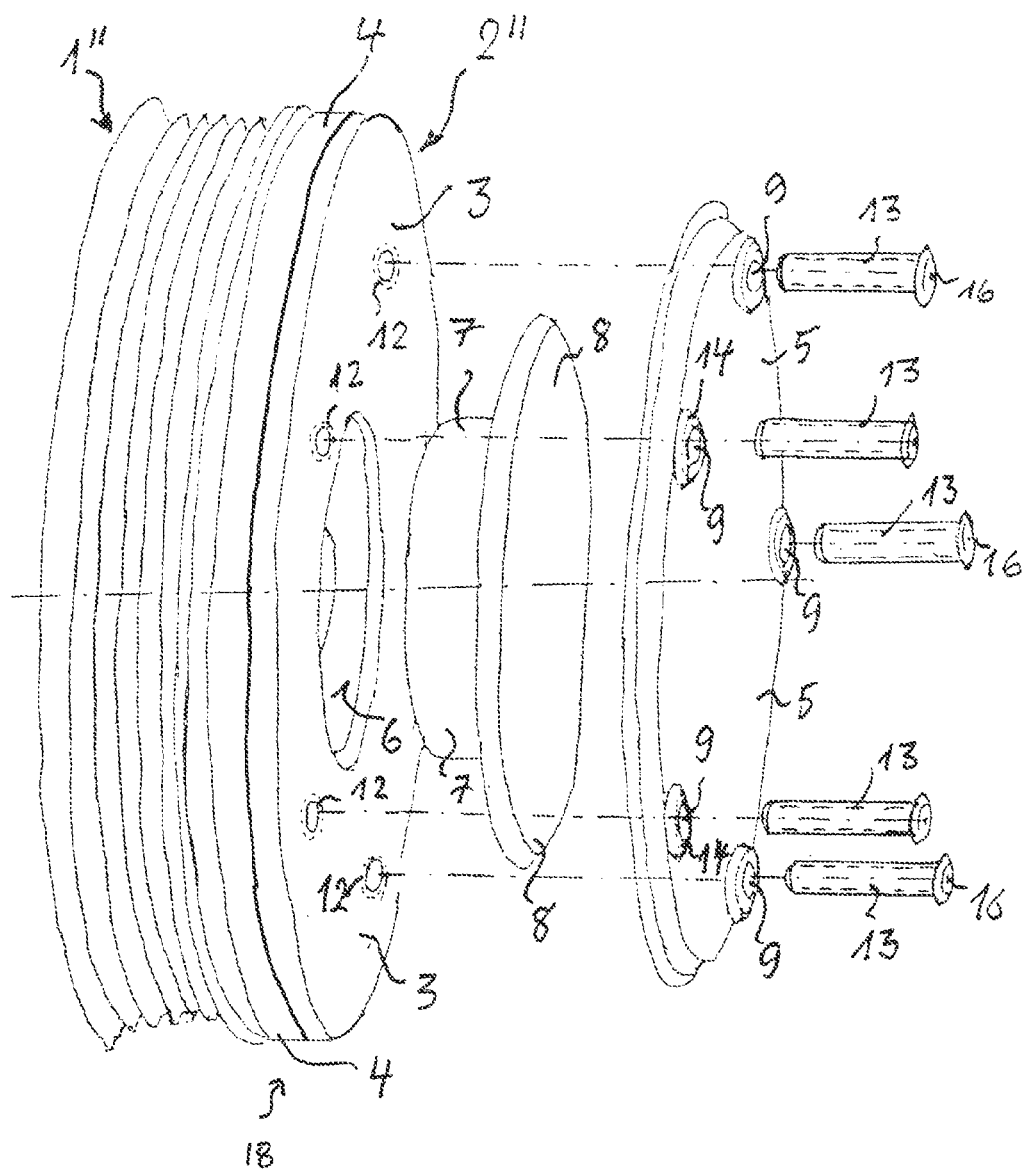
FIG. 3 shows a schematic, expanded, perspective view of a belt pulley with torsional vibration damper according to a second embodiment.

FIG. 3 shows a schematic, expanded, perspective view of a belt pulley 1'' with torsional vibration damper 2'' according to a second embodiment. Components with same functions as in FIG. 1 are marked with same reference numbers and are not explained separately. The difference of this second embodiment compared with the first embodiment according to FIG. 1 is that no threaded pins are provided, but threaded bores 12 are introduced into the drive disc 3. The threaded bores 12 are aligned with corresponding screws 13, which can be screwed into the threaded bores 12 via bores 9 of the cover disc 5. To this end, the screws 13 have an internal socket head 16. In addition it is also provided here that sound-damping washers 14 are arranged between the respective head of an internal socket head screw 13 and the cover disc 5.

Figure 4:
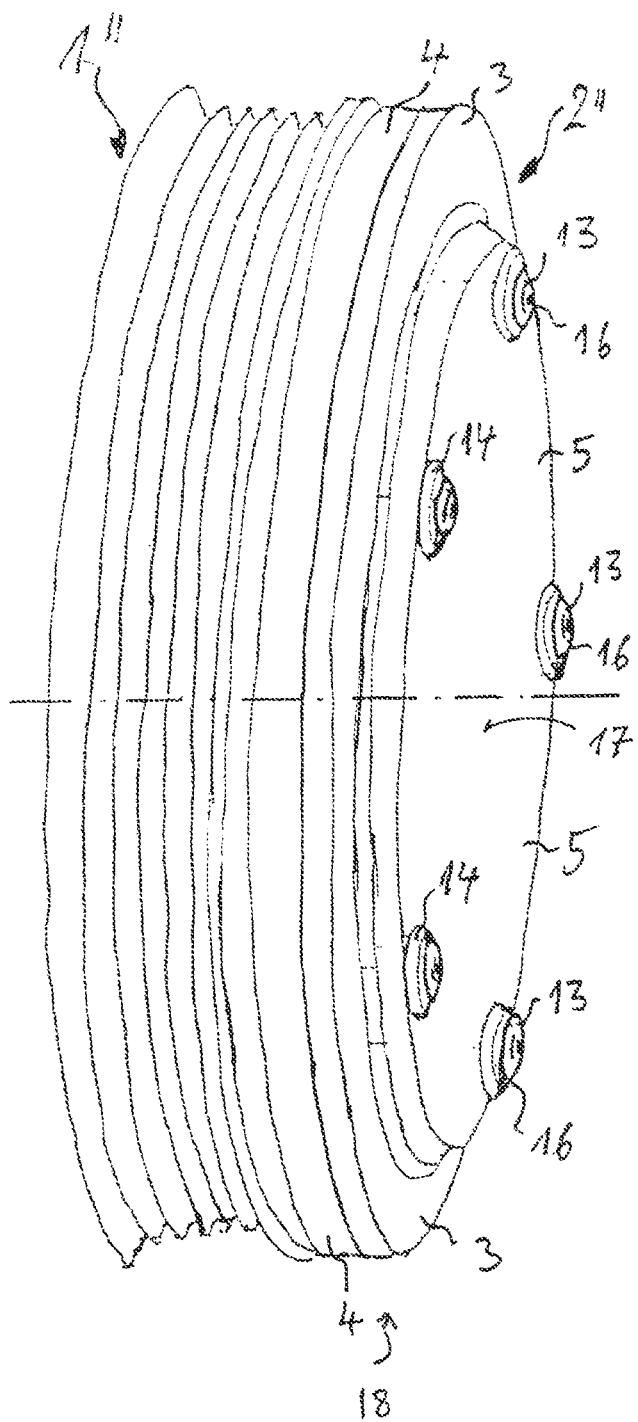
FIG. 4 shows a schematic, perspective view of the belt pulley with torsional vibration damper according to FIG. 3 following assembly of the belt pulley.

FIG. 4 shows a schematic perspective view of the belt pulley 1" with torsional vibration damper 2" according to FIG. 3 following assembly of the belt pulley 1". Following the assembly, the two embodiments merely differ in that now only the internal socket heads 16 with the sound-damping washers 14 project out of the cover disc 5 and thus project less far from the top side 17 of the cover disc 5 than in the first embodiment.

Figure 5:
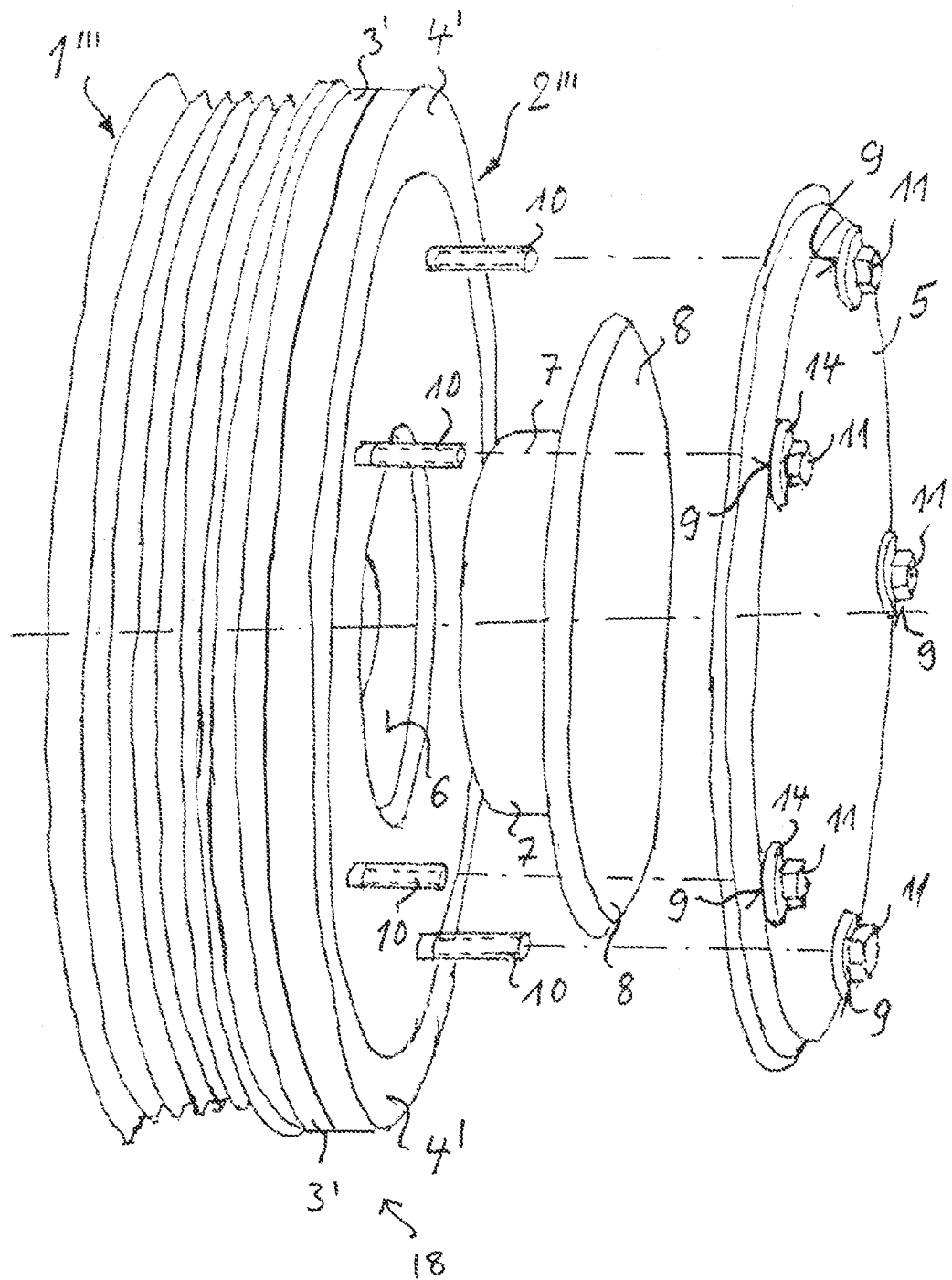
FIG. 5 shows a schematic, expanded, perspective view of a belt pulley with torsional vibration damper according to a third embodiment.

FIG. 5 shows a schematic, expanded, perspective view of a belt pulley 1' with torsional vibration damper 2''' according to a third embodiment. The third exemplary embodiment differs through the end body 18 of the belt pulley 1'. In the third embodiment, the torsional vibration damper 2''' forms the end body 18 of the belt pulley 1' and the drive disc 3''' is arranged on the inside of the bulge 4' of the torsional vibration damper 2". In this third embodiment, the hollow space 6 is arranged in the torsional vibration damper 2' and the cover disc 5 is fixed on the torsional vibration damper so that the sound-damping component 7 is arranged in the hollow space 6 of the torsional vibration damper 2''' and is clamped between the torsional vibration damper 2''' and the cover disc 5.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A belt pulley for a crankshaft in a vehicle is mountable on an end of the crankshaft that projects from an engine block, comprising:
    a drive disc that is fixable on the end of the crankshaft that project from the engine block in a rotationally fixed manner;
    a torsional vibration damper comprising a bulge that is elastically connected to the drive disc;
    an annular end body that comprises a hollow space, wherein the hollow space comprises a hollow circular center of the annular end body, and wherein the hollow space is arranged coaxially with the crankshaft and in the middle of the drive disc;
    a sound-damping component that is arranged completely in the hollow space except for a flange-like collar; and
    a cover disc that is configured to cover the hollow space.

2. The belt pulley according to claim 1, wherein the drive disc provides the end body.

3. The belt pulley according to claim 1, wherein the torsional vibration damper provides the end body.

4. The belt pulley according to claim 1, wherein the cover disc is fixed on the end body in a sound-damping manner.

5. The belt pulley according to claim 1, wherein the sound-damping component has the flange-like collar that is arranged between the end body and the cover disc.

6. The belt pulley according to claim 1, wherein the sound-damping component comprises an element.

7. The belt pulley according to claim 1, wherein the sound-damping component comprises a press fit in the hollow space.

8. The belt pulley according to claim 1, wherein the sound-damping component is connected to the hollow space in a materially joined manner.

9. The belt pulley according to claim 1, wherein the bulge of the torsional vibration damper is connected to the drive disc via a spring element.

10. The belt pulley according to claim 1, wherein the torsional vibration damper is connected to the belt pulley via the bulge in a fixed manner.

11. The belt pulley according to claim 1,
    wherein the cover disc comprises a plurality of bores that are aligned with threaded pins on the end body, and
    wherein nuts are engaged with the threaded pins and configured to fix the cover disc and the flange-like collar of the sound-damping component on the end body.

12. The belt pulley according to claim 1,
    wherein the end body comprises threaded bores and the cover disc comprises bores that are aligned with the threaded bores, and
    wherein a plurality of screws is engaged with the threaded bores and fixes the cover disc and the collar of the sound-damping component on the end body.

13. The belt pulley according to claim 1, wherein the bulge of the torsional vibration damper is connected to the drive disc via an elastic component.

14. A vehicle, comprising:
    an engine block;
    a crankshaft comprising a crankshaft end projecting from the engine block
    a belt pulley arranged the end projection from the engine block, the belt pulley comprising:
        a drive disc that is fixable on the end of the crankshaft that project from the engine block in a rotationally fixed manner;
        a torsional vibration damper comprising a bulge that is elastically connected to the drive disc;
        an annular end body that comprises a hollow space, wherein the hollow space comprises a hollow circular center of the annular end body, and wherein the hollow space is arranged coaxially with the crankshaft and in the middle of the drive disc;
        a sound-damping component that is arranged completely in the hollow space except for a flange-like collar; and
        a cover disc that is configured to cover the hollow space,
    wherein the drive disc of the belt pulley is fixed on the end of the crankshaft projecting from the engine block in a rotationally fixed manner.

15. The belt pulley according to claim 6, wherein the element is an elastic foam material.

16. The belt pulley according to claim 6, wherein the element is a felt material saturated with a hydrophobic varnish.

17. The belt pulley according to claim 6, wherein the element is an elastomer fibrous plastic.

18. The belt pulley according to claim 6, wherein the element is a cork material coated with hydrophobic varnish.

* * * * *